United States Patent [19]

Foster

[11] Patent Number: 4,962,848

[45] Date of Patent: Oct. 16, 1990

[54] RECIPROCATING FLOOR CONVEYOR

[76] Inventor: Raymond K. Foster, P.O. Box 1, Madras, Oreg. 97741

[21] Appl. No.: 464,938

[22] Filed: Jan. 16, 1990

[51] Int. Cl.⁵ .......................................... B65G 25/00
[52] U.S. Cl. ............................... 198/750; 414/525.1
[58] Field of Search .............. 198/773, 774, 775, 750; 414/525.1, 525.9

[56]  References Cited

U.S. PATENT DOCUMENTS 4,856,645  8/1989  Hallstrom, Jr. ..................... 198/750

Primary Examiner—Joseph E. Valenza
Assistant Examiner—D. Glenn Dayoan
Attorney, Agent, or Firm—Delbert J. Barnard

[57] ABSTRACT

A conveyor made up of a plurality of groups of floor members (10). Each group includes two movable floor members (1, 2) and a fixed floor member (F). The movable floor member (1 and 2) are moved in unison, from a start position to an advanced position. This moves a load (L) on the floor because the area of the moving floor members (1 and 2) is twice the area of the fixed floor members (F). When the movable floor members (1 and 2) reach their advanced positions, they are stopped. Then, the first floor members (1) are returned to their start positions while the second movable floor members (2) are held stationary. The load (L) does not move rearwardly because it is held by the stationary floor members (2) and the fixed floor members (F). Next, the second movable floor members (2) are returned to their start positions while the first movable floor members are held stationary. Again, there is no movement of the load (L) because it is held by the stationary floor members (1) and the fixed floor members (F). When the second movable floor members (2) reach their start positions, the sequence is repeated.

4 Claims, 5 Drawing Sheets

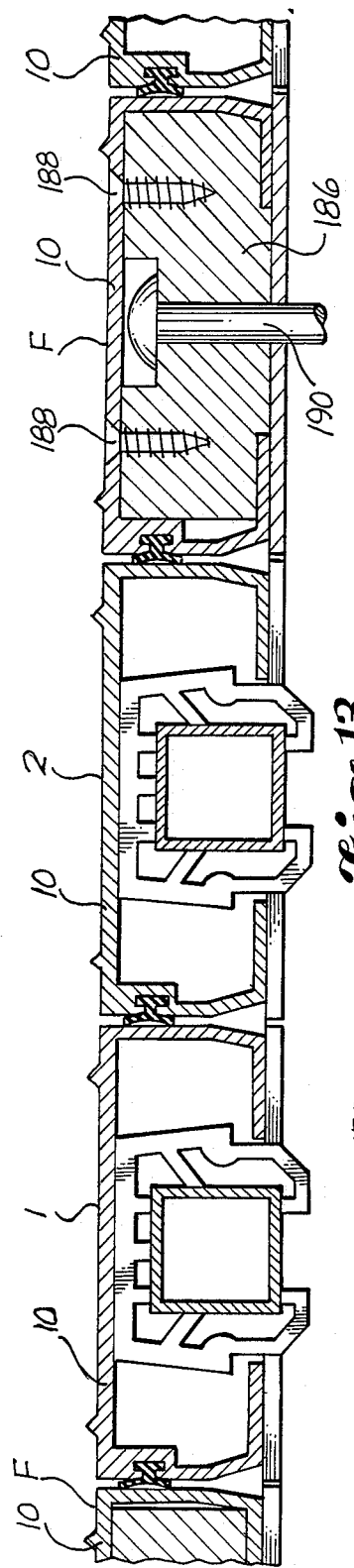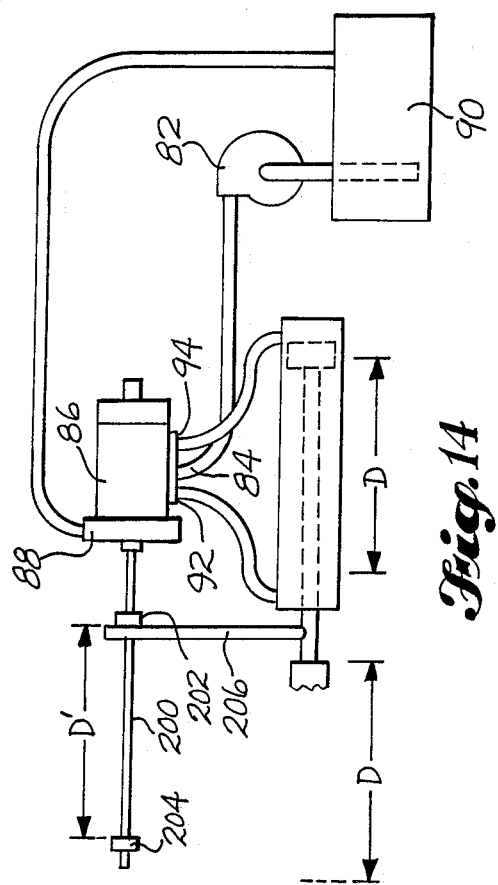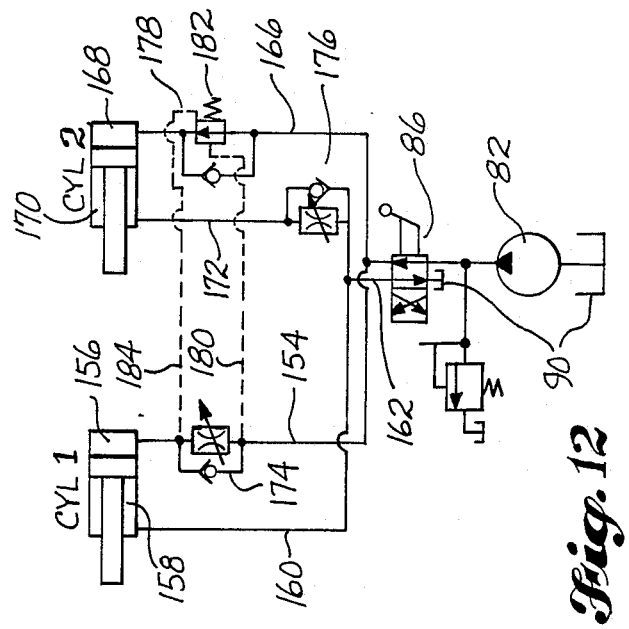
Fig. 13
Fig. 14
Fig. 12

RECIPROCATING FLOOR CONVEYOR

TECHNICAL FIELD

This invention relates to reciprocating floor conveyors. More particularly, it relates to the provision of a simplified reciprocating floor conveyor characterized by a plurality of groups of three elongated floor members, wherein two floor members of each group are movable in unison in one direction and sequentially in the opposite direction, and the third floor member is always fixed in position.

BACKGROUND INFORMATION

Reciprocating floor conveyors are now relatively well known. U.S. Pat. No. 2,629,504, granted Feb. 24, 1953, to Walter R. Peterson, discloses what has been referred to as a two-slat system. This conveyor comprises a plurality of groups of floor members or slats, with two such members in each group. All of the members are moved together in a first direction for conveying a load. One member of each group is then moved rearwardly to a start position. Then the second member of each group is moved rearwardly to a start position. Then, the sequence is repeated. West German Patent Publication No. 1,296,087, published in May 1969, discloses a four-slat system. The floor members are divided into a plurality of groups and each group includes four floor members. In operation, three members of each group are always moving forwardly, to advance a load, and the fourth member is returning rearwardly to a start position. U.S. Pat. No. 3,534,875 granted in October, 1970, to Olof A. Hallstrom, discloses a three-slat system which operates in the same manner as the system disclosed by West German Patent Publication No. 1,296,087. U.S. Pat. No. 3,905,290, granted Sept. 16, 1975, to Robert A. Caughey, discloses a conveyor having four slat members in each group. All four members are moved together in a first direction, to convey a load. The members are then returned sequentially to a start position. U.S. Pat. No. 4,143,760, granted in March 1979, to Olof A. Hallstrom, discloses a three slat system with the same operating sequence as the conveyor disclosed in U.S. Pat. No. 3,905,290.

I have developed and marketed several styles of reciprocating floor conveyors. One such style is disclosed in my U.S. Pat. No. 4,709,805, granted Dec. 1, 1987. A second style is disclosed in my U.S. Pat. No. 4,748,893, granted June 7, 1988. A third style is disclosed in my U.S. Pat. No. 4,793,469, granted Dec. 27, 1988. A fourth style is disclosed in my U.S. Pat. No. 4,817,783, granted Apr. 4, 1989. U.S. Pat. No. 4,709,805 discloses a four-slat system. Each of the other patents discloses a three-slat system. Each of the three-slat conveyors utilize the sequence of operation originated by Caughey and disclosed in his U.S. Pat. No. 3,905,290.

The object of the present invention is to provide a reciprocating floor conveyor having substantially the same advantage as the conveyors disclosed by the aforementioned U.S. Pat. Nos. 3,905,290; 4,143,760; 4,709,805; 4,748,893; 4,793,469 and 4,817,783, but with only two movable slat members in each group. This permits a reduction in costly components and a weight reduction.

DISCLOSURE OF THE INVENTION

The reciprocating floor of the present invention is basically characterized by a plurality of groups of elongated floor members mounted adjacent each other in a single plane, with each group comprising two movable floor members and a third fixed-in-position floor member. The two movable floor members are mounted adjacent each other for longitudinal movement in unison, between start and advanced positions, and independent movement sequentially from the advanced position back to the start position. The fixed floor members are fixed in position at the start position. In use, when the movable floor members are moved in unison between the start and advanced position, they present a larger area in contact with the load than do the fixed-in-position floor members. As a result, the load is moved. When each movable floor member of each group is returning from the advanced position to the start position, there is always a movable floor member in each group which is not moving. It, and the fixed-in-position floor member of the group, will together present a larger area in contact with the load than the movable floor member of the group. As a result, the load will be held in position.

In preferred form, the conveyor comprises a pair of transverse drive beams. One movable floor member of each group is connected to one of the drive beams and the other movable floor member of each group is connected to the second of the drive beams. The conveyor includes a supporting framework for the floor members. The framework includes a window into which the drive beams are situated. The conveyor includes a separate drive unit for each drive beam which is connected to its drive beam and is positioned below the floor members. In preferred form, this window has a length which is only slightly longer than the zone in which the drive beams move during operation of the conveyor.

Other objects, features and advantages of the invention are hereinafter described as part of the "Best Mode of the Invention."

BRIEF DESCRIPTION OF THE DRAWINGS

Like reference numerals are used to designate like components throughout the several figures of the drawing, and:

FIG. 12 is a diagram of another control system;

FIG. 13 is a fragmentary sectional view of an embodiment of the floor members; and FIG. 14 is a diagram of a switching control mechanism for the switching valve.

BEST MODE FOR CARRYING OUT THE INVENTION

Figure 1:
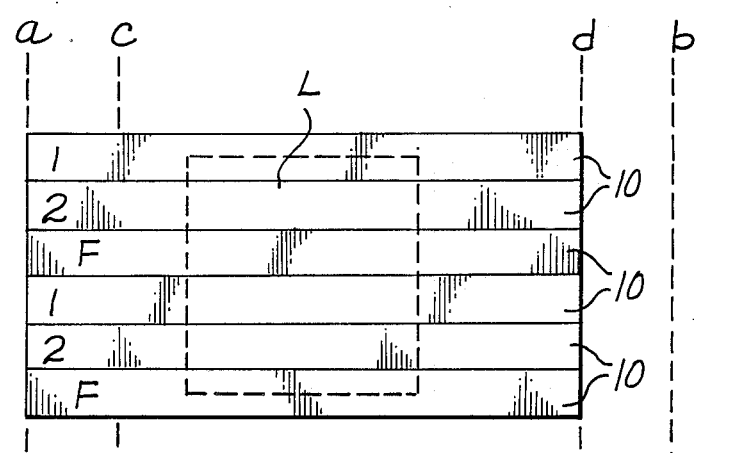
FIG. 1 is a top plan diagram of a conveyor which includes three floor members per group, with each common floor member being identified by a common number or letter, such conveyor being shown in a fully retracted position.
Figure 2:
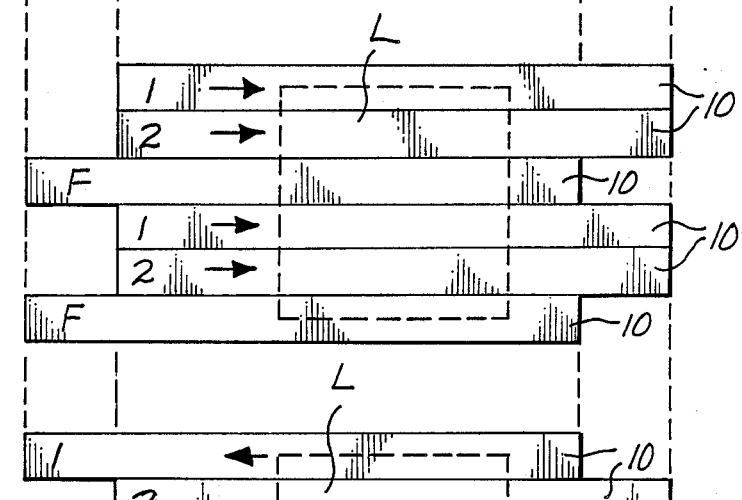
FIG. 2 is a view like FIG. 1, but showing the movable floor members 1 and 2 being advanced in unison to convey a load in the direction indicated by arrows.
Figure 3:
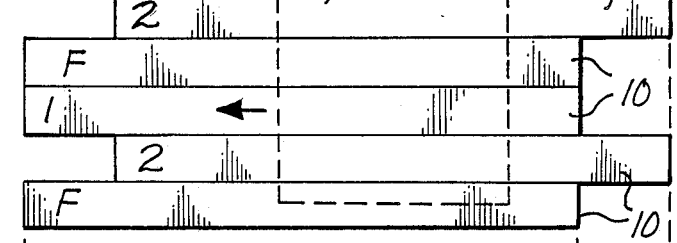
FIG. 3 is a view like FIGS. 1 and 2, showing movable floor members 2 stationary and movable floor members being retracted.
Figure 4:
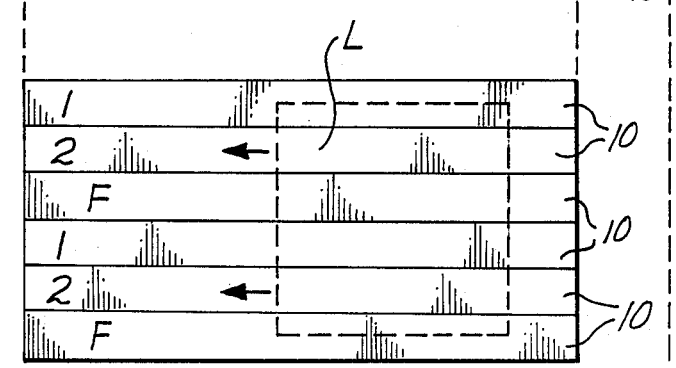
FIG. 4 is a view like FIGS. 1-3, showing movable floor members stationary and movable floor members 2 being retracted.

Referring to FIGS. 1-4, the reciprocating floor conveyor of this invention is characterized by a plurality of side-by-side groups of side-by-side floor members. In preferred form, each group comprises three floor members, two of which are movable and the third of which is fixed in position. In FIGS. 1-4, all of the floor members are designated 10, to indicate that they may be identical in construction. In addition, the movable floor members are designated 1 and 2 and the fixed floor members are designated F. Referring to FIG. 1, all floor members 1, 2, F of each group are shown in a "start" position. In this position, the rear ends of the floor members 1, 2, F are at station "a" and the leading ends are at station "d". This is the fixed position of the fixed floor members F. In FIG. 1, a load L is shown positioned on the conveyor. Continuing to FIG. 2, in this figure the movable floor members 1 and 2 are all shown in the process of moving the direction indicated by movement arrows. Of course, the fixed floor members F do not move. They remain fixed. There are twice as many floor members moving as are fixed. As a result, the load L will move with the moving floor members 1 and 2. This is because the moving floor member 1 and 2 exert twice as much friction on the load L as do the fixed floor members F. The movable floor members 1 and 2 move forwardly until their forward ends are at station "b" and their rear ends are at station "c". This is termed the "advanced" position of the floor members 1 and 2. As shown by FIG. 3, after the movable floor members 1 and 2 reach the advanced position, the floor members 2 are held stationary while the floor members 1 are retracted. At this time, the stationary floor members 2 and the fixed floor members F present twice as much area to the load L as the moving floor member 1. As a result, the load stays stationary. FIG. 4 shows floor members 1 stationary and floor members 2 retracting. The stationary floor members 1 and the fixed floor members F present twice as much area to the load L as the moving floor members 1. As a result, the load L is stationary. Following return of the floor members 1 to the start position, the sequence of operation as illustrated by FIGS. 1-4 is repeated. This sequence is repeated over and over until the load has been moved off the conveyor.

Figure 5:
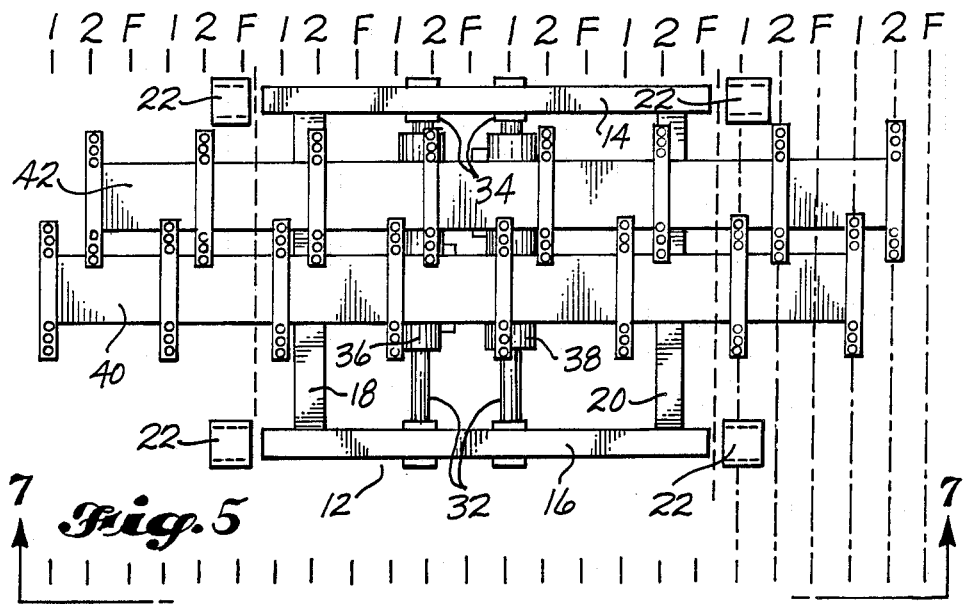
FIG. 5 is a top plan view of an embodiment of the drive assembly of the invention.
Figure 6:
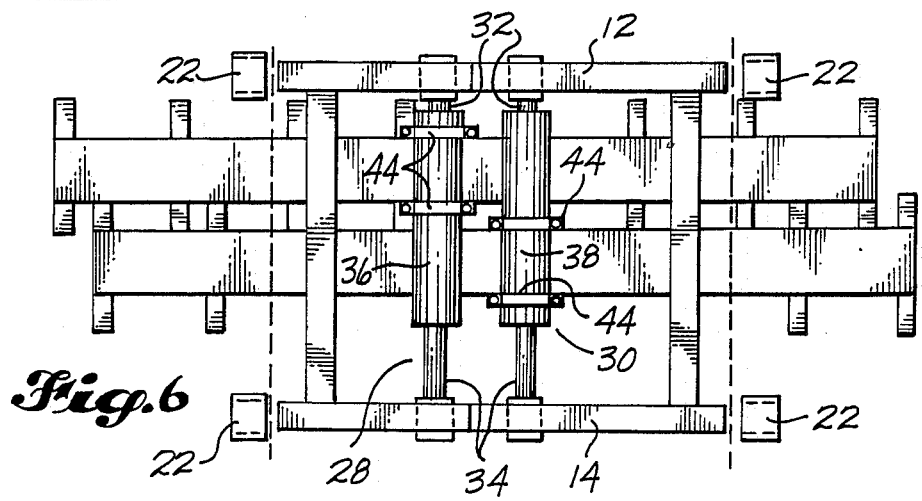
FIG. 6 is a bottom plan view of the assembly shown by FIG. 5.
Figure 7:
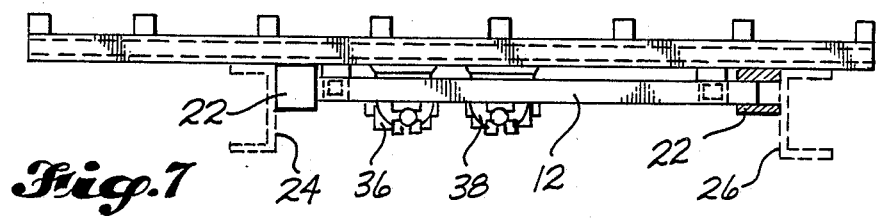
FIG. 7 is an elevational view of the assembly shown by FIGS. 5 and 6, taken substantially along the aspect of line 7—7 in FIG. 5.

FIGS. 5-7 illustrate a drive assembly which is very much like the type of drive assembly disclosed in my aforementioned U.S. Pat. No. 4,709,805.

Drive assembly 12 may comprise a pair of longitudinally spaced apart transverse mounting frames 14, 16, which may be interconnected by a pair of laterally spaced apart longitudinal frame members 18, 20. Telescopic securement tubes 22 may be associated with each end of each frame member 14, 16, for facilitating securement of the frame in a position between center frame members 24, 26 of a center frame-type vehicle, as illustrated in FIG. 7.

In the embodiment of FIGS. 5-7, a pair of drive units 28, 30 are shown extending between and connected at their ends to the mounting frame members 12, 14. Each drive unit 28, 30 has a pair of opposite fixed-end portions 32, 34 and a movable central portion 36, 38. In preferred form, the movable center portion is a cylinder body and the fixed-end portions 32, 34 are piston portions. However, it is within the purview of the invention to reverse these parts and provide fixed cylinder bodies and a central piston portion having a piston head at each of its ends, one in each cylinder body. In either event, the movable central portion of each drive unit 30 is secured to a transverse drive beam. Drive beam 40 is connected to drive unit component 36. Drive beam 42 is secured to drive unit component 38. In preferred form, the connection is accomplished by means of a pair of spaced apart clamps 44 of the type disclosed in detail in my aforementioned U.S. Pat. No. 4,793,469. As illustrated in that patent, and as also illustrated in my aforementioned U.S. Pat. No. 4,748,893, the cylinder body has a bearing at each of its ends which, together with the pistons, stiffen the drive unit 28, 30 so that it is capable of withstanding substantial sideways forces. In an embodiment with fixed cylinder bodies and a movable piston portion, each cylinder body is provided with a similar bearing at its rod end for the same purpose.

The piston heads and the bearings at the ends of the cylinder chamber cooperate to make each drive unit 28, 30 a good structural member for carrying bending and twisting loads applied to it. The spacing apart of the clamps 44 create a couple where each drive beam 40, 42 is connected to the travelling central portion of its drive unit. The fixed connections at the ends of the drive units, by which the drive units are connected to the mounting members 12, 14, create another couple which functions to transfer bending and twisting forces and movements to the mounting frame members 12, 14. Lastly, the end connections of the mounting members 12, 14 to the center frame beams 24, 26 create a couple for transferring the bending and twisting forces and movements to the frame members 24, 26.

The frame members 12, 14 are connected to the center frame members 24, 26 which are located below the framework on which the floor members are supported. As best illustrated in the aforementioned U.S. Pat. No. 4,143,760, the floor members 10 are primarily supported on and by a framework of longitudinal and transverse frame members. In an installation which includes center frame beams 24, 26, this framework is positioned on top of the beams 24, 26. An advantage of securing the mounting frame members 12, 14 to the center frame members 24, 26 is that the pounding forces of the drive units 28, 30 are not transmitted to the floor members supporting framework as they would be if the drive units 28, 30 were interconnected between such framework and the floor members.

Figure 8:
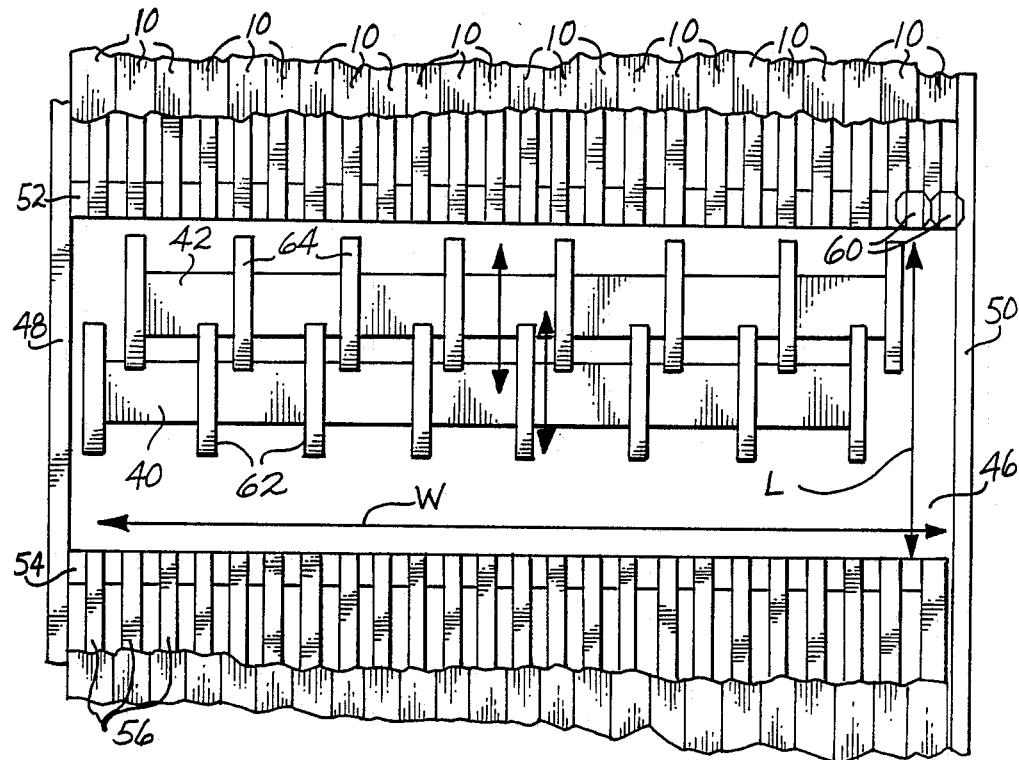
FIG. 8 is a top plan view of a mid-portion of a conveyor embodying the invention, with the floor members being cut away in the vicinity of the transverse drive beams, so as to illustrate a window in the floor member supporting framework and showing the drive beams situated within the windows.

FIG. 8 shows a window 46 which is formed in the above discussed framework. FIG. 8 shows side frame members 48, 50 which are part of the framework. It also shows a pair of transverse frame members 52, 54 which at their ends are connected to the side frame members 48, 50. A plurality of parallel guide beams are supported on the framework. Some of these guide beams are designated 56 in FIG. 8. A floor supporting bearing 60 is provided where each guide beam 56 crosses over a transverse frame member. In FIG. 8, a pair of the bearings 60 are illustrated, it being understood that such bearings are in fact provided at each location where a guide beam 56 crosses, and is secured to a transverse frame beam.

The main purpose of FIG. 8 is to show the relatively small size of the window 46. Window 46 has a width W which extends from side beam 48 over to side beam 50. It also has a length L which is slightly longer than the longitudinal movement zone of the drive beams 40, 42 and the cleats 62, 64 which are connected to them. As is well known, these cleats extend upwardly into open spaces in the floor members 10 and the floor members 10 are secured to the cleats 62, 64, such as by use of screw fasteners. An important advantage of the present invention is that because only two floor members of each group moves, there only needs to be two transverse drive beams 40, 42. As a result, the zone of movement of these transverse drive beams 40, 42, and hence the window length L, are substantially shortened.

My aforementioned U.S. Pat. No. 4,748,893 illustrates a side elevational view of a drive unit and a drive beam within the window. Accordingly, an illustration of this type has not been repeated herein.

Figure 9:
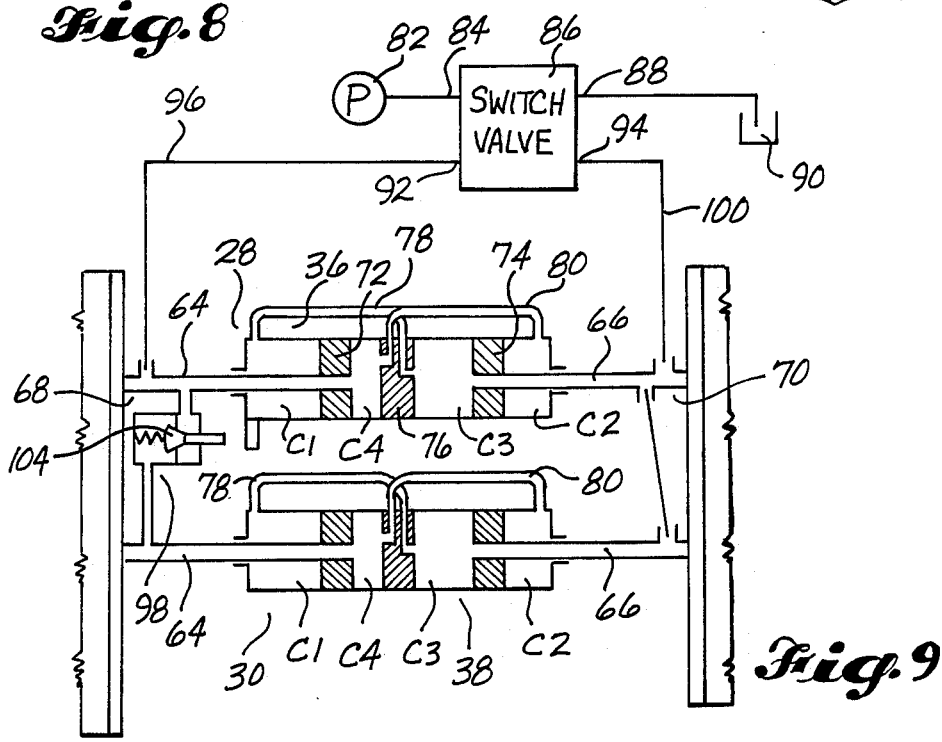
FIG. 9 is a diagram of a control system for the drive assembly illustrated by FIGS. 5-7.

FIG. 9 illustrates an example control system for a conveyor which includes travelling cylinders 36, 38, of the type disclosed in my aforementioned U.S. Pat. No. 4,748,893. Drive unit 28 comprises a pair of fixed piston rods 64, 66, the outer ends of which are fixed at 68, 70, respectively. Details of this connection are shown in U.S. Pat. No. 4,748,893. A piston head 72 is secured to the inner end of rod 64. A piston head 74 is secured to the inner end of piston rod 66. Cylinder body 36 is divided down its middle by a wall 76. This divides the drive unit 28 into four chambers designated C1, C2, C3 and C4. As illustrated, chambers C1 and C3 are interconnected by a tube 78. Chambers C2 and C4 are interconnected by a tube 80. Drive unit 30 is of the same construction and also includes chamber C1, C2, C3 and C4. A pump 82 delivers hydraulic fluid pressure to a port 84 of a switching valve 86. A second port 88 leads back to a tank or reservoir 90. Switching valve 86 includes two additional ports 92, 94. In one position of the switching valve, the hydraulic pressure is delivered out through port 92 into conduit 96. Port 94 is at that time connected by the switching valve to the tank 90. The fluid pressure in conduit 96 enters into a passageway in rod 94 and flows into chambers C2 and C4. At the same time, fluid pressure from conduit 96 passes through a valve 98 and flows through a passageway in rod 64 of cylinder 30, into the chambers C2, C4. As a result, the cylinders 36, 38 move in unison, to the right end of FIG. 9. This is the movement of the floor members 1 and 2 from their start to their advanced positions. When the floor members 1 and 2 reach their advanced positions, the switching valve 86 is reversed, preferably in a manner to be described below. This applies the hydraulic fluid pressure to conduit 100 and connects conduit 96 to the tank 90. The hydraulic pressure in conduit 100 enters into passageways within each of the piston rods 66. This hydraulic fluid pressure is then transmitted to chambers C1 and C3. Chambers C2 and C4 of drive unit 28 are in open communication with the tank 90 via conduit 96 and switching valve 86. However, the exit of fluid from chambers C2 and C4 of drive unit 30 is blocked by valve 98. As a result, cylinder body 36 moves by itself to the left end of FIG. 9. This movement returns the floor members 1 back to their start position. When the cylinder body 36 reaches the end of its travel, it contacts and depresses valve operator 102. Movement of valve operator 102 in turn moves valve plug 106 away from its valve seat. This opens communication of a passageway through valve 98 which communicates the chambers C2 and C4 in drive unit 30 with conduit 96 leading back to tank 90. As a result, cylinder body 38 now moves to the left end of FIG. 9. This movement causes the floor members 2 to move back to their start positions. At the end of travel of cylinder body 38, the switching valve 86 again switches in position to restart the cycle.

A typical switching valve 86 is hereinafter described in connection with FIG. 14.

Figure 10:
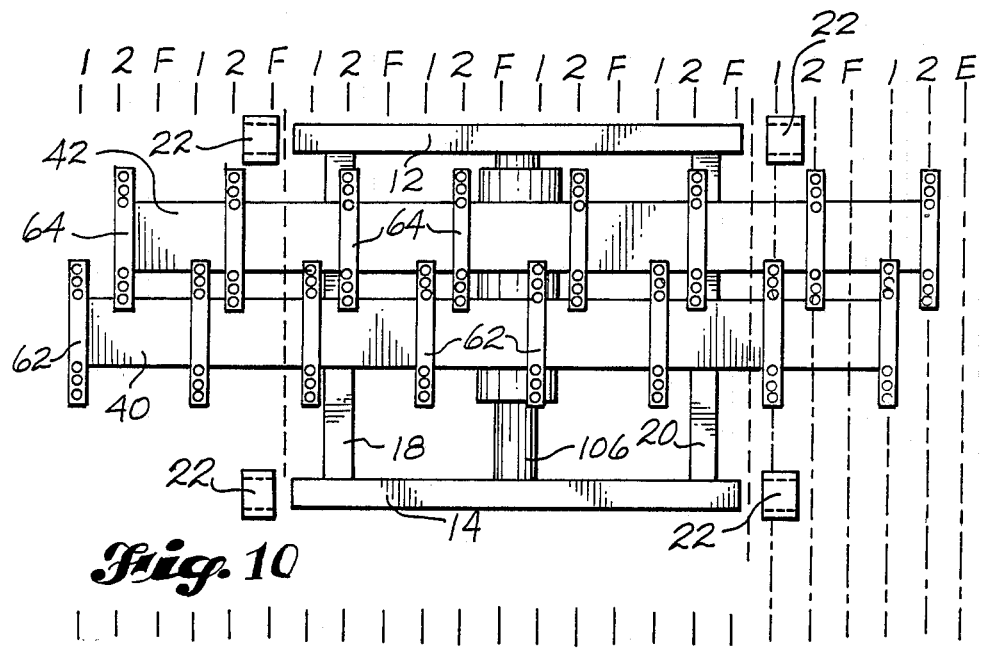
FIG. 10 is a view like FIG. 5, but of a modified drive assembly.
Figure 11:
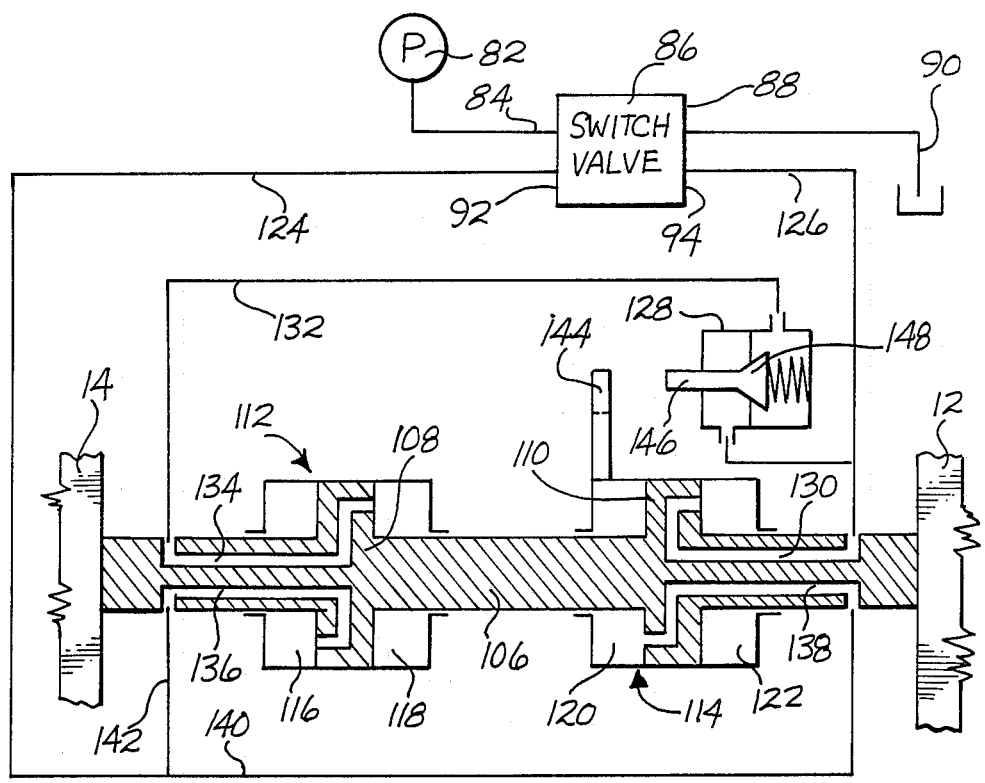
FIG. 11 is a diagram of a control system for the drive assembly shown by FIG. 10.

FIGS. 10 and 11 illustrate a modified embodiment of the drive assembly. In this drive assembly, a single piston rod 106 is interconnected between the mounting frame members 12, 14. Piston rod 106 includes a pair of longitudinally spaced apart piston heads 108, 110. A cylinder body 112 is mounted to travel on piston 108. A similar cylinder body 114 is mounted to travel on piston head 110. Load carrying bearings are provided at each end of each of the cylinder bodies 112, 114. Within cylinder body 112, there is a first chamber 116 on a first side of piston head 108 and a second chamber 118 on the opposite side. In similar fashion, within cylinder body 114 there is a first chamber 120 on one side of piston 110 and a second chamber 122 on the opposite side. The system includes a pump 82, a switching valve 86 and a tank 90, as before. Port 84 of switching valve 86 is connected to the pump 82. Port 88 is connected to the tank 90. Port 92 is connected to a conduit 124 and port 94 is connected to a conduit 126. Conduit 126 leads into both a valve 128 and a passageway 130 which leads into chamber 122. A conduit 132 extends from valve 128 into a passageway 134 which leads into chamber 118. When the switching valve 86 is positioned to connect hydraulic fluid pressure to conduit 126, and connect conduit 124 to tank, the fluid pressure is conveyed through passageway 130 into chamber 122, and through valve 128 into conduit 132 and passageway 134 into chamber 118. At the same time, chambers 116 and 120 are connected via passageways 136, 138, respectively, to conduits 140 and 142 which are, in turn, connected to conduit 124 which is connected by the switching valve 86 to the tank 90. As a result, the two cylinder bodies 112, 114 move in unison to the left end of FIG. 11. This moves the two drive beams 40 and 42 and the movable floor members 1 and 2 from their start to their advanced positions. When the floor members reach their advanced positions, the switching valve 86 is reversed. This communicates pressure to chambers 116 and 120, via conduits 124, 140 and 142, and passageways 136 and 138. Passageway 130 leading from chamber 122 is connected directly to passageway 126 which is connected by the switching valve 86 to tank 90. However, flow from chamber 118 through passageway 134 and conduit 132 is blocked by valve 128. As a result, the cylinder body 114 moves by itself towards the right end of FIG. 11. This movement moves the floor members 1 from their advanced positions back to their start positions. When cylinder body 114 reaches the end of its travel, a member 144 carried by it contacts a valve operator 146. The valve operator 146 is moved, and this in turn moves the valve plug 148 out from a seated position, permitting flow through the valve 128, from conduit 132 to conduit 126. This in turn allows hydraulic fluid to flow from chamber 118 out through passageway 134 into conduit 132. It then flows through the valve 128 into conduit 126, and then through switching valve 126 to the tank 90. When this happens, the cylinder body 112 moves toward the right end of FIG. 11. This causes movement of the floor members 2 from their advanced positions back to their start positions. When cylinder body 112 reaches the end of its path of travel, the switching valve 86 is switched in position to start a new cycle.

The details of the cylinders, the valve, the fittings, the connections, etc. are not illustrated herein because they are well illustrated in my aforementioned U.S. Pat. No. 4,748,893.

FIG. 12 illustrates a control circuit of a type that is disclosed in the publication "Hydraulic Circuits and Control Systems", authored by J. R. Fawcett, B.Sc. M. I. Mech. E., and published by Trade and Technical Press Ltd., Morden, Surrey, England. A copy of this publication was received by the University of Washington Library on Nov. 21, 1973, such copy bearing library number TJ843F35. This circuit comprises a pump 82 leading to a switching valve 86. In FIG. 12, the switching valve 86 is shown in a position in which fluid pressure is communicated via a conduit 154 to chamber 156 of a first cylinder. The opposite chamber 158 is connected by a conduit 160 back to a port 162 in the switching valve 82 which is connected to tank 90. Pressure is also connected to conduit 166 which leads to chamber 168 in a second cylinder. The opposite chamber 170 of this cylinder is connected to a conduit 172 which leads back to port 162. Speed control valves 174, 176 are provided in conduits 154, 172, respectively. A sequencing valve 178 is provided in conduit 166. Speed control valve 174 is termed a "meter-in valve" and speed control valve 176 is termed a "meter-out valve." When the switching valve 86 is in the position illustrated, fluid pressure is delivered to chamber 156 of the first cylinder. A pilot line 180 directs the pressure over to valve 178 on the side of the valve opposite a spring 182. A second pilot line 184 downstream of valve 174 communicates downstream pressure with the spring end of the valve member. The pressure in pilot line 180 forces the valve over against the spring, and so closes valve 178 and the inlet to chamber 168. As a result, there is only flow into chamber 156 of the first cylinder and out from chamber 158 of that cylinder. The first cylinder moves. It is connected to the first floor members 1 and moves them from their advanced positions back to their start positions. There is no movement of the second cylinder at this time. When the first cylinder reaches the end of its stroke, flow ceases and the pressure on the opposite sides of valve 174, and within the two pilot lines 180 and 184, equals. The spring of valve 178 takes control and opens the valve 178 so that the second cylinder now comes under pressure and moves forwardly under the control of its speed control valve. When the directional control valve 154 is reversed, both pistons move simultaneously. As they move, they move the floor members 1 and 2 in unison, from their start to their advanced positions.

FIG. 13 is a view very similar to FIG. 13 in my U.S. Pat. No. 4,785,929, granted Nov. 22, 1988. The floor members, the seal, the bearings and the guide beams are the same. As a result, they will not be described again in detail in this document. A key difference is that each third floor member F is fixed. This may be done by securing the fixed floor members F to a core member 186, such as by screw fasteners 188, with the core members 186 being bolted to the framework which supports the floor members.

In FIG. 12, the two cylinders are illustrated in the same manner as in circuit diagram 75 in the "Hydraulic Circuits and Control Systems" publication. These cylinders may be of the type illustrated above in FIGS. 9 and 11. Or, they may be as illustrated in the aforementioned U.S. Pat. Nos. 3,905,290 and 4,143,760.

FIG. 14 is a duplication of FIG. 4 in U.S. Pat. No. 3,530,895, granted Sept. 29, 1970 to Arthur A. Rothrock. The disclosure of this patent is hereby incorporated herein by this specific reference. The switching valve 86 may, as disclosed in this patent, include a control rod 200 to which a pair of spaced apart contact members 202 and 204 are connected. A portion of the movable component of the drive unit which is connected to the floor members 2 carries a contact arm 206. As the movable component of the drive unit reaches the end of its travel in a first direction, the arm 206 contacts member 202 and moves the rod 200 towards the left end of FIG. 14. When the movable component of the drive unit approaches the end of its path to travel in the opposite direction, the arm 206 contacts member 204. This moves rod 200 towards the left end of FIG. 14. As described in U.S. Pat. No. 3,530,895, the movement of the control rod 200 in the manner described causes a movement of a main valve member within the switching valve 86, causing the valve 86 to reverse the connection of pressure and return each time the drive unit reaches the end of its stroke of travel.

From the foregoing, various further modifications, component arrangements, and mode of utilization of the reciprocating floor conveyor of the invention will be apparent to those skilled in the art to which the invention is addressed, within in the scope of the following claims.

What is claimed is:

1. A reciprocating floor conveyor for moving a load, comprising a plurality of groups of elongated floor members mounted adjacent each other in a single plane, characterized by each said group comprising:

two movable floor members mounted adjacent each other for longitudinal movement in unison, between start and advanced positions, and independent movement sequentially from the advanced position back to the start position, and a third fixed-in-position floor member, whereby, when the movable floor members are moved in unison between the start and advanced positions, they present a larger area in contact with the load than the fixed-in-position floor members, and when each movable floor member is returning from the advanced position to the start position, there is always a movable floor member which is not moving, and it and the fixed-in-position floor member will together present a larger area in contact with the load than the movable floor member which is retracting from its advanced position to its start position.

2. A reciprocating floor conveyor according to claim 1, further comprising two transverse drive beams, with one movable floor member of each group being connected to one of said drive beams and the other movable floor member of each group being connected to the second of said drive beams, and said conveyor including a supporting framework for said floor members, said framework including a window into which said drive beams are situated, and a separate drive unit for each drive beam connected to the drive beam and positioned below said floor members.

3. A reciprocating floor conveyor according to claim 2, wherein the drive beams are moved by the drive units back and forth longitudinally of the conveyor, for first advancing and then returning the floor members, and said window in the framework has a longitudinal length slightly longer than the longitudinal space occupied by the drive beams as they move back and forth longitudinally of the conveyor.

4. A reciprocating floor conveyor according to claim 1, wherein the fixed and movable floor members are substantially identical.

* * * * *